(12) United States Patent
Besson et al.

(10) Patent No.: US 7,822,553 B2
(45) Date of Patent: Oct. 26, 2010

(54) METHODS FOR ELECTROMAGNETIC MEASUREMENTS AND CORRECTION OF NON-IDEAL RECEIVER RESPONSES

(75) Inventors: Christian Besson, Le Pecq (FR); Kamal Babour, Bures sur Yvette (FR); Kambiz A. Safinya, Houston, TX (US); Edward Nichols, Berkeley, CA (US)

(73) Assignee: WesternGeco L.L.C., Houston, TX (US)

( * ) Notice: Subject to any disclaimer, the term of this patent is extended or adjusted under 35 U.S.C. 154(b) by 126 days.

(21) Appl. No.: 11/770,902

(22) Filed: Jun. 29, 2007

(65) Prior Publication Data

US 2009/0001985 A1    Jan. 1, 2009

(51) Int. Cl.
*G01V 3/00* (2006.01)

(52) U.S. Cl. .......................................................... 702/2

(58) Field of Classification Search .................. 702/1, 702/2, 5–11, 14, 38, 57, 65, 77, 188, 189; 324/350, 365; 455/40
See application file for complete search history.

(56) References Cited

U.S. PATENT DOCUMENTS

| | | | |
|---|---|---|---|
| 3,670,247 A * | 6/1972 | Gutton et al. ................. 455/40 |
| 4,027,234 A | 5/1977 | Mosnier ....................... 324/246 |
| 4,072,941 A * | 2/1978 | Hamid et al. ................... 342/22 |
| 5,770,945 A * | 6/1998 | Constable .................... 324/350 |
| 2008/0169817 A1* | 7/2008 | Morrison et al. ............. 324/365 |

FOREIGN PATENT DOCUMENTS

| WO | WO 2006/026361 | 3/2006 |
|---|---|---|
| WO | 2007053251 A1 | 5/2007 |

OTHER PUBLICATIONS www.emgs.com.
PCT Search Report, dated Dec. 9, 2008, for Application No. PCT/US2008/067971.
Ph.D. Thesis, Dec. 3, 1984, Study of a Method for Electrical Detection of Conductive Anomalies Near a Drilling Site, by Stephane Sainson, with English translation.
U.S. Appl. No. 11/694,108, Office Action dated Oct. 5, 2009, pp. 1-5 and attachments.

* cited by examiner

*Primary Examiner*—Mohamed Charioui

(57) ABSTRACT

A method for determining formation electrical properties includes deploying one or more receivers for electromagnetic logging; obtaining measurement data indicative of the formation electrical properties using the deployed receivers; correcting the measurement data for receiver imperfection; and inverting the corrected measurement data to obtain one or more parameters of formation electrical properties.

13 Claims, 3 Drawing Sheets

METHODS FOR ELECTROMAGNETIC MEASUREMENTS AND CORRECTION OF NON-IDEAL RECEIVER RESPONSES

FIELD OF THE INVENTION

The present invention relates to methods and apparatuses for subsurface surveying. Particularly, the present invention relates to methods for electromagnetic measurements and for correction of non-ideal receiver responses.

BACKGROUND OF THE INVENTION

During exploration and reservoir assessment and development in oil and gas industry, hydrocarbons, such as oil and gas, as well as geological structures that tend to bear hydrocarbon, may be detected based on their properties (e.g., mechanical and electromagnetic (EM) properties) that are different from those of the background geological formations.

Electromagnetic (EM) measurements are commonly used in oil and gas exploration. Among the EM properties, the resistivity ($\rho$), which is an inverse of the electrical conductivity ($\sigma$), is particularly useful. This is because hydrocarbon-bearing bodies, such as oil-bearing reservoirs, gas injection zones, and methane hydrates, have very different resistivities, as compared with their background geological formations. For example, hydrocarbon-bearing reservoirs typically have resistivities one to two orders of magnitude higher than those of the surrounding shale and water-bearing zones. Therefore, resistivity mapping or imaging may be used to locate the zones of interest in contrast to the background resistivity. This method has been used successfully in both land and subsea exploration.

Resistivity mapping may be achieved by generating an EM signal above the formations of interest and receiving the resulting EM field at selected locations. The received data is affected by a number of parameters, for example, the distance between the EM signal source and the receivers, EM field frequency, polarity of the EM waves, depth and thickness of the reservoir, resistivity of the hydrocarbon bearing zones, and the surrounding geological formations. In marine applications, the received signal may depend on the resistivity of the seawater, which depends on the water temperature, salt content, etc.

The EM signal may be from natural sources or from artificial sources. Among the EM methods, magneto-telluric (MT) methods rely on the naturally-occurring EM fields in the stratosphere surrounding the earth. Because carbonates, volcanics, and salt all have large electrical resistivity as compared with typical sedimentary rocks, MT measurements may produce high-contrast images of such geostructures. MT measurements are particularly useful in examining large-scale basin features and for characterizing reservoirs below basalt (volcanics) layers beneath a sea bed.

Controlled source electromagnetic ("CSEM") methods use EM transmitters, called sources, as energy sources, and the receivers measure the responses of the geological structures to the transmitted signals. The transmitter may be a direct current (DC) source, which injects a DC current into the geological formations. DC currents are typically injected into the formations using contacting electrodes. Recent EM measurement methods use EM sources that produce time-varying electrical and/or magnetic (EM) fields. The EM fields may be a pulse generated by turning on and off an EM transmitter, and in this case, the receivers effectively measure a pulse response of the geological structures. EM measurements may use a transmitter that transmits a fixed frequency or a range of frequencies. The higher frequency EM sources permits resolution of finer structures, whereas the lower frequency EM sources allows one to probe deeper into the formations.

In marine explorations, low-frequency EM methods are typically used. The low-frequency EM waves may induce a current, i.e., the Faraday (eddy) current, to flow in the earth formation and in the sea water. The current density depends on the resistivity of the earth formation and the sea water. A voltage drop across two locations produced by the current may be measured and used to infer the resistivity distribution in the formation. Alternatively, one may measure the secondary magnetic fields produced by the induced current.

As discussed, CSEM uses an artificial EM source to generate controlled EM fields that penetrate the ocean and the subsea formations. As illustrated in FIG. 1, in a conventional CSEM method, an electrical dipole transmitter 11 is towed by a ship 10 at a short distance above the seabed 12. The transmitter 11 induces EM fields in the sea water 14, geological layers 15 and 16 and the oil-bearing layer 17. In some cases, the oil-bearing layer 17 effectively functions as a waveguide for the EM fields as layer 17 may have significantly higher resistivity than the surrounding layers 15 and 16.

To detect the EM signals, a number of receivers 13 are deployed on the seabed 12. The EM signals measured by the seafloor receivers 13 may then be used to solve an inverse problem to estimate the resistivity distributions in the geological structures, including layers 15, 16, and 17. Although the figure depicts a layered earth for simplicity, it should be clear to one skilled in the art that the method applies to any other complex earth geometries. When the transmitter 11 is not used, the receivers 13 may be used to detect EM signals induced by the naturally-occurring MT fields.

A typical structure of a traditional receiver 20 is illustrated in FIG. 2. As shown, the receiver 20 typically has a body (frame) 1 with arms 3a, 3b, and 3c attached thereto. At the end of each arm 3a, 3b, or 3c is an electrode 5a, 5b, or 5c, as well as an electrode 5d located near the receiver frame 1, which are for detecting the electrical and/or magnetic field signals. The receiver frame 1 encloses the receiver circuitry 2. The circuitry 2 connects, through electrical cables 4a, 4b, 4c, and 4d, to electrodes 5a, 5b, 5c, and 5d. The cables 4a, 4b, 4c, and 4d may be enclosed in protecting enclosures forming the "arms" 3a, 3b, and 3c. The arms are typically made of insulating materials, such as plastic. The electrodes 5a, 5b, 5c, and 5d are typically made of sandwiched Ag—AgCl. Because these electrodes need to be in direct contact with sea water, they need constant maintenance to prevent problems arising from corrosion.

The electrodes are used in pairs to measure different components of the electrical or magnetic fields. The electric field is traditionally measured as the voltage drop V between two opposing electrodes. For example, the transverse component of the electric field is measured by the dipole configuration formed by electrodes 5a and 5b in the horizontal direction, and the vertical component of the electric field is measured by the dipole configuration formed by electrodes 5c and 5d in the vertical direction. Although not depicted, it is also common to measure the electric field in a direction that is perpendicular to the electrodes 5a-5b and the electrodes 5c-5d. Such a direction would be into the page in FIG. 2, and the receiver may include two additional arms to support the additional electrodes. This would enable the receiver to measure the electric field in three orthogonal directions. Further, it is also common to include magnetic field sensors to measure the magnetic field intensity, typically in three orthogonal directions.

For the same electric field E, the detected voltage V would be larger if the distance d between the opposing electrodes is larger because V=d E. However, it is impractical to increase d beyond a certain limit for the purpose of increasing the sensitivity of the measurements. This is because it will be more difficult to transport and deploy large-sized arms, and the reliability of the receivers also suffers. On the other hand, the arms cannot be too short because the receiver needs to have sufficient sensitivity for EM fields, especially in the low frequency regime, e.g., between 0.02 Hz and 10 Hz. The lengths of the arms 3a and 3b supporting the electrodes 5a and 5b in a typical receiver are around 4 meters, and the vertical arm 3c is typically extended about 2 meters from the frame 1.

Due to the large size of the receivers, these electrode arms and the receiver body (frame) are usually transported as separate components and assembled before deployment. The assembling of the receivers is a very time consuming process during an operation. In addition, frequent connecting and disconnecting of the electrodes, arms and cables from the receiver circuitry may lead to reliability and sensitivity problems. Furthermore, in order to measure the low frequency EM fields, the electrodes are required to be non-polarizable, typically Ag—AgCl electrodes. This presents a technical challenge to make sensitive receivers.

The receiver sensitivity determines the sensitivity of an EM survey. The resolution of the survey image may also be affected by the receiver sensitivity. A major source of noises in the receiver 20 is the bandwidth limited Johnson noises of the receiver circuitry 2. State-of-the-art receivers can achieve a noise level of 1 nV/√Hz or better at the input stage to the receiver circuitry 2. If all other sources of noise are properly managed, the total noise level of the receiver 20 may be controlled to a level of around 100 pV/m/√Hz for the transverse electric field component and around 300 pV/m/√Hz for the vertical electric field component. This sensitivity determines the limit of how sensitive the EM survey will be to deeply buried structures within the subsurface and in general the resolution and fidelity of any image derived therefrom.

Improvement of the receiver sensitivities is limited by the impedance of the input stage of the receiver circuitry 2 and by the noise generated in the antenna electrodes 5a, 5b, 5c, and 5d. In addition, the long arms 3a, 3b, and 3c supporting the electrodes 5a, 5b, 5c are subject to vibrations induced by sea currents, and may even resonate acoustically. Such vibration or resonance significantly increases the noise level.

Due to the technical difficulties in measuring the electric fields by voltage drops, it may be more advantageous to measure an electric field E by measuring electric current densities J and the electric conductivity σ of the sea water. Then, the electric field E may then be derived using the Ohm's law, $$E=J/\sigma, \qquad (1)$$

where J is the current density, and σ is the electric conductivity. This principle has been applied to measuring electric fields using opposing conductive plates in a cubic or rectangular receiver frame, as taught in French Patent 8419577, issued to Jean Mosnier, and in WO 2006/026361 by Steven Constable. This French Patent and the WO 2006/026361 are incorporated by reference in their entireties. One example of such a receiver is illustrated in FIG. 3.

As shown in FIG. 3, a receiver 300 includes conductive plate electrodes 31a, 31b, 31c, and 31d attached to the outside surfaces of the cubic receiver frame 30. These conductive plates are insulated on the sides 37a, 37b, 37c, and 37d facing away from the sea water. FIG. 3 shows the receiver 300 with insulation 37, but those having skill in the art will realize that insulation may be omitted if the air in the receiver will provide adequate insulation. Electrodes 31a and 31b are connected to a coupling device 34b via cables 32a and 32b, respectively. Similarly, electrodes 31c and 31d are connected to a coupling device 34a via cables 32c and 32d, respectively. An electric current in the horizontal direction will flow into electrode 31a, through cable 32a and coupling device 34b, and then out of electrode 31b back to the water. The current density in the horizontal direction defined by electrodes 31a and 31b can then be measured by the measurement circuitry. Similarly, an electric current density in the vertical direction defined by electrodes 31c and 31d may also be measured by the measurement circuitry. In addition, an electric current density in the third orthogonal direction may be measured by using a third pair of electrodes (not shown) outside the receiver box 30. The coupling devices 34a and 34b couple the current flows to the electronic circuitry 36. The electronic circuitry 36 amplifies the currents and feed the signals to the rest of the measurement circuitry.

In the receiver 300 illustrated in FIG. 3, an impedance Z between opposing electrodes, e.g., 31a and 31b, is chosen to be equal to the impedance of a volume of liquid (e.g., sea water) between the electrodes 31a and 31b. Such a receiver may be referred to as an "impedance-matched" receiver. The impedance matching ensures that the electric field is not distorted in the presence of the receiver, as compared to what it would be in the absence of the receiver, so that the measured signal is undisturbed by the receiver. When measuring small electric fields, the "impedance-matched" receivers may have limited sensitivity or they will need to have larger, and more cumbersome, electrodes.

While these prior art receivers have been useful in oil and gas exploration, there remains a need for better receivers that are easy to use and can provide robust measurements.

SUMMARY OF INVENTION

In one aspect, the invention relates to a method for determining formation electrical properties that includes deploying one or more receivers for electromagnetic logging, obtaining measurement data indicative of the formation electrical properties using the deployed receivers, correcting the measurement data for receiver non-ideality, and inverting the corrected measurement data to obtain one or more parameters of formation electrical properties.

In another aspect, the invention relates to a method for determining formation electrical properties that includes deploying one or more receivers for electromagnetic logging, obtaining measurement data indicative of the formation electrical properties using the deployed receivers, and inverting the measurement data to correct the measurement data and to obtain one or more parameters of formation electrical properties.

Other aspects and advantages of the invention will be apparent from the following description and the appended claims.

DETAILED DESCRIPTION

The following disclosed examples relate to methods of electric field measurements. Example methods may use receivers that are not limited to those having impedance-matched electrodes. That is, methods of the invention may use "non-ideal" receivers, in which the impedance between pairs of electrodes may not be perfectly matched with the impedance of the medium (e.g., fluids) in which the receiver is positioned. As a result, the presence of a receiver may induce perturbation in the electric fields at the measurement site. However, the perturbation caused by the presence of the receiver may be corrected.

While the disclosed examples are not limited to any particular type of receivers or any particular type of logging operations, the following description will use a Mosnier type receiver in subsea logging operations to illustrate embodiments of the invention. The use of such examples is for clarity of illustration, and not intended to limit the scope of the invention.

As noted above, prior art receivers, such as that disclosed by Mosnier, typically require impedance matching between the electrode pairs so that the presence of the receivers does not perturb the electrical fields to be measured. However, seawater conductivity depends on various factors, including the depth, salt concentrations, temperatures, time, pressure, etc. It is difficult to know beforehand the precise conductivity of the seawater at the site of receiver deployment. While it is possible to include circuitries to dynamically adjust the impedance between the electrodes to match the seawater impedance, this approach is difficult in practice. Thus, while impedance matching simplifies the interpretation of the measured signals, impedance matching may not always be practical.

In accordance with certain disclosed examples, receivers for EM measurements do not require electrode pairs to be impedance-matched with respect to the impedance of the liquid to be measured. In some situations, receivers may be impedance-matched before deployment. However, the impedance may or may not be matched under actual measurement conditions. Other situations can also cause the receiver to be non-ideal, such as when the electrodes do not have identical shapes/sizes, or when they are not parallel. Therefore, in some examples, no assumption of impedance match is made. Furthermore, the impedance between the electrode pairs may be intentionally mismatched; for example, the impedance may be reduced to enhance the received signal.

Figure 1:
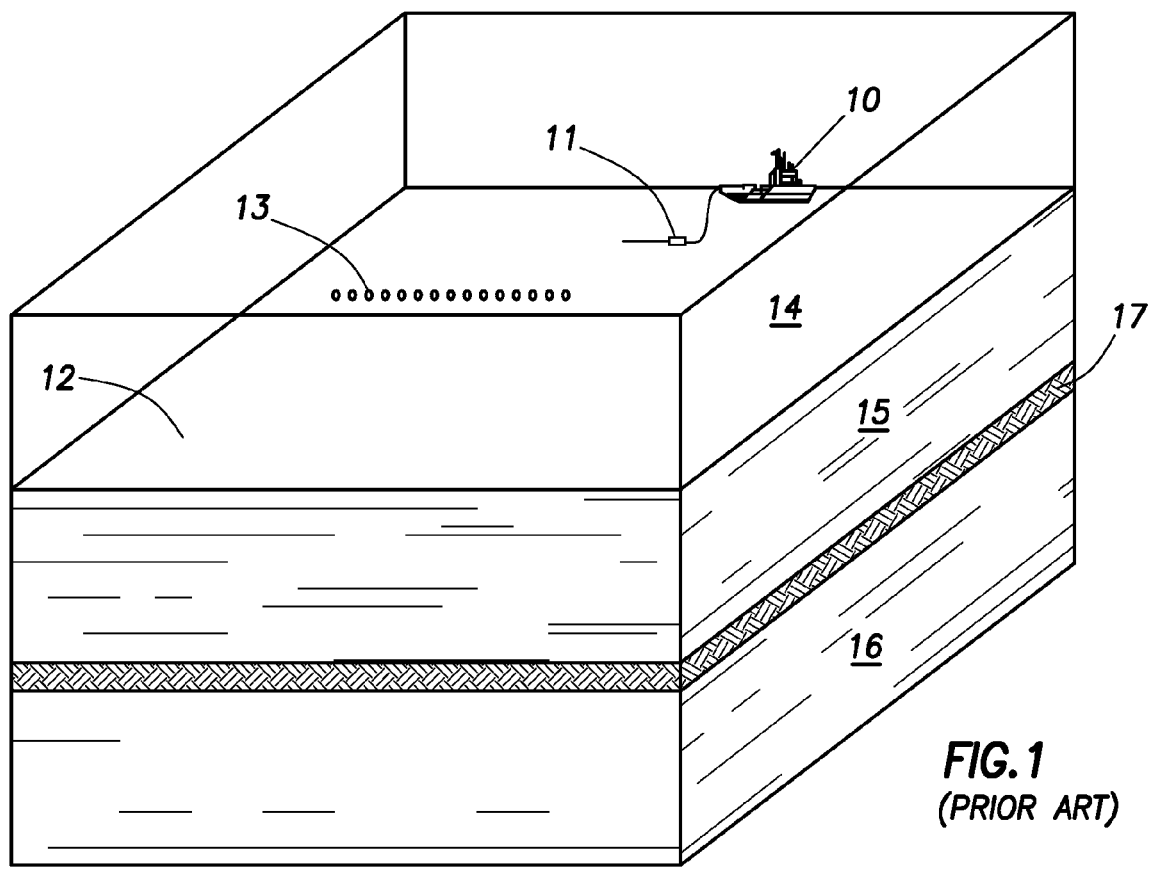
FIG. 1 shows an example of a conventional controlled source electromagnetic measurement system.
Figure 2:
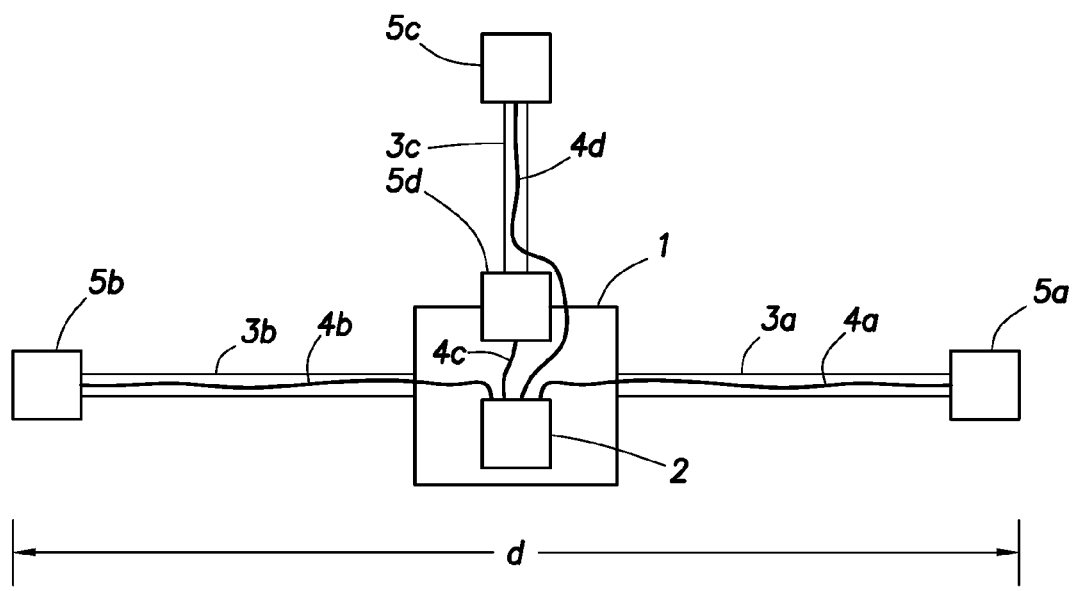
FIG. 2 shows an example of a conventional receiver including four electrodes for measuring an electric field by measuring a voltage drop across the opposing electrodes.
Figure 3:
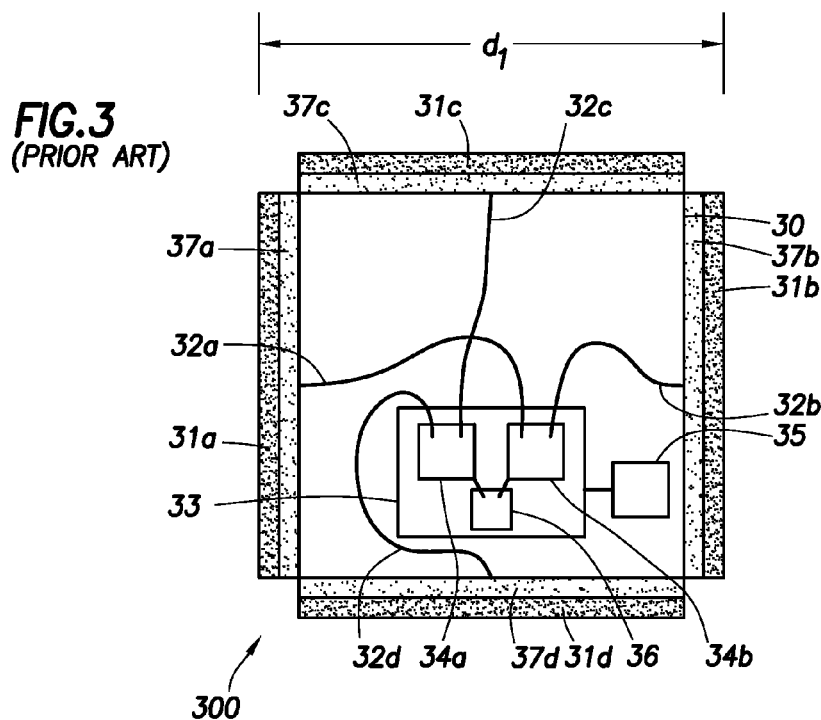
FIG. 3 shows an example of a prior-art receiver having a cubic frame for measuring an electric field by measuring an electric current.
Figure 4:
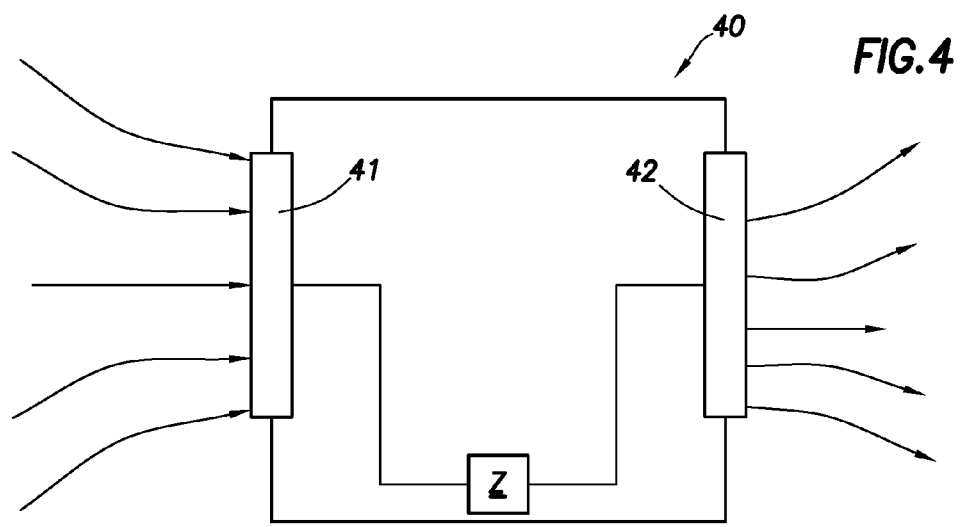
FIG. 4 shows an example of a current-focusing receiver.

An example of an intentionally mismatched receiver in accordance with one example is illustrated in FIG. 4, which shows a receiver having reduced impedance as compared to the impedance of the seawater. The receiver 40 has an impedance Z between two electrodes 41 and 42 that is substantially smaller than the impedance of the seawater between the electrodes that is displaced by the receiver. A number of advantages can arise from a receiver design illustrated in FIG. 4. For example, the measured electric currents are effectively "focused" or amplified, leading to an improved signal-to-noise ratio (SNR) in the measurements. In addition, the electrochemical noise caused by the surfaces of the electrodes 41 and 42 contacting the seawater is reduced because these noise sources are effectively "short circuited" by the low impedance Z.

Figure 5:
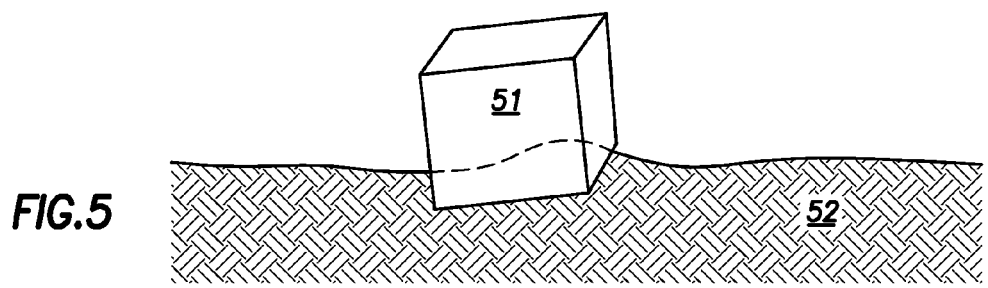
FIG. 5 shows an example of a partially buried receiver illustrating non-ideal receiver responses.

In addition to the above-mentioned factors that may cause a receiver to become non-ideal under the measurement conditions, an ideal receiver may sometimes become non-ideal because it can sink into soft sediment at the sea bottom. As illustrated in FIG. 5, an impedance-matched receiver 51 may become non-ideal (impedance-mismatched) because it is partly buried in soft sediment 52. In this scenario, the initial impedance between the electrodes may be perfectly matched with the impedance of the seawater. However, the effective measurement surfaces of the electrodes are altered by the environment under the measurement conditions. As a result, the "effective" impedance between the electrodes is not matched with that of the seawater. Such a receiver cannot be treated as an ideal receiver when analyzing the measurement data.

The above examples show how non-ideal measurements may occur, intentionally or unintentionally. Regardless of the underlying causes of the non-ideal conditions, these measurements may need to be corrected in order to derive useful electrical properties of the measurement sites.

In accordance with one example, a correction factor may be applied to measured data obtained with any receiver, ideal or not. The correction factor typically depends on one or more independent parameters. One of ordinary skill in the art would appreciate that the method used to determine the correction factor may depend on the types of parameters that impact the measurement data. For example, when a low-impedance receiver (as that shown in FIG. 4) is used to boost the SNR, more current flows through the electrodes. The correction factor would depend on the impedance of the seawater and the impedance of the receiver (i.e., the impedance Z between the opposing electrodes). One can determine a correction factor based on the impedance values of the seawater and the receiver. Alternatively, the increased current densities may also be viewed as resulting from electrodes having increased surface areas. Therefore, the correction factor may also be understood as equivalent to correcting the effective surface areas of the electrodes.

The correction factor may be determined beforehand (or after the measurements) using several approaches: for example, by using numerical or analytical modeling, or by calibration of receiver responses (using an independent set of measurements in the presence of a reference electrical field, for example).

In accordance with some embodiments of the invention, the correction may be accomplished by applying a transform function to the measured data. For example, the observed electric field and magnetic field components, $E_i^{obs}$ and $H_i^{obs}$, wherein i=1, 2, 3 represent three orthogonal directions, are the values directly measured by the receivers. These observed values may be different from the $E_i^{true}$ and $H_i^{true}$ of the seawater in the absence of the receivers are absent, i.e., true values. The true values $E_i^{true}$ and $H_i^{true}$ may be derived from the $E_i^{obs}$ and $H_i^{obs}$ by applying a proper transform function.

A proper transform may be derived as follows. For example, the non-perturbed field components can be obtained using transforms $F_E$ and $F_H$, $$E_i^{true} = F_E(E_j^{obs}, H_j^{obs}, P_k), \qquad (2)$$

$$H_i^{true} = F_H(E_j^{obs}, H_j^{obs}, P_k), \qquad (3)$$

where i,j=1, 2, 3, and $P_k$'s are one or more independent parameters.

The parameters $P_k$ may be derived from the configuration of the receiver and the environment. For example, when a receiver is partially buried in weak sediment as illustrated in FIG. 5, the parameters $P_k$ may include $P_1$ and $P_2$, wherein $P_1$ characterizes the conductivity ratio between the seawater and the weak sediment layer, and $P_2$ characterizes the area ratio between the area of the electrodes that is in contact with seawater and the area that is buried. When the receiver is tilted, one or more parameters describing the tilt angles may be needed.

It is noted that for each i=1, 2, 3, either of $E_i^{true}$ and $H_i^{true}$ may depend on all components of $E_j^{obs}$ and $H_j^{obs}$ for all j=1-3. Thus, the transforms $F_E$ and $F_H$ may have a complex matrix form.

The transforms $F_E$ and $F_H$ may be determined before, during, or after the measurements are made, for example, through detailed computer modeling of the receiver responses to various values of parameters that are relevant under the measurement conditions. The transforms $F_E$ and $F_H$ may be provided to users in the form of, for example, functional curves, computer software packages, or lookup tables having correspondence between ($E_i^{true}, H_i^{true}$) and ($E_j^{obs}, H_j^{obs}$).

Using transforms may be more convenient than using correction factors, when the measured components of the field are independent, but not orthogonal. In this case, the orthogonal components of the field may be recomputed from the independent measurements. Another example where this approach is useful is when the receivers of the type described by Mosnier are placed at the sea bottom and become partially buried, as illustrated in FIG. 5. In this case, the current collection electrodes may be partly in one medium (weak sediment) and partly in another (seawater). The measured response in this case can be transformed, for example, using a function that depends on one parameter, the conductivity ratio between seawater and the weak sediment layer.

In another example, correction of measurement data may be accomplished with modeling, in which the receivers' impedances are built into the model used in inversion. Any suitable model known in the art may be used, such as a layered-earth model. That is, the receivers themselves may be treated as one or more elements in the model, like the geological layers for example. The model can then be used to invert the measurement data to derive the true values of the electric field distributions. This approach provides a most general method for correcting any non-ideal measurements.

The following description uses a Mosnier type receiver, which has been modified to have a low impedance between the electrodes (such as the one shown in FIG. 4), to illustrate in more detail how this general modeling approach may be applied. This simple case is chosen for clarity of illustration. However, it would be apparent to one skilled in the art that this approach can also be applied to other complex inversions and receivers.

Figure 6:
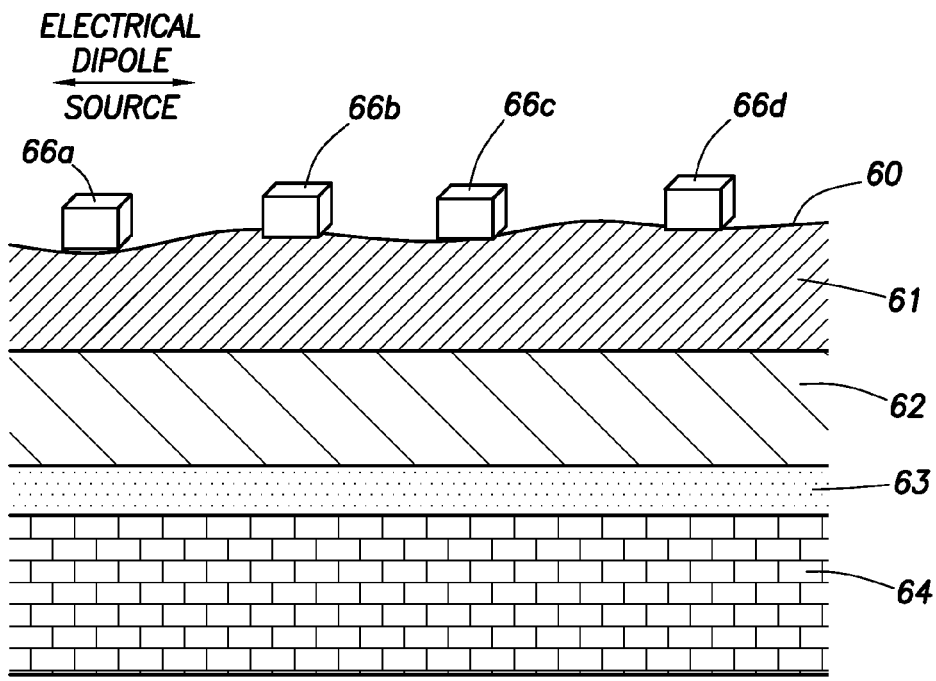
FIG. 6 shows an example of a layered-earth model for data inversion.

FIG. 6 illustrates one such model, a layered-earth model. As shown in this model, four receivers 66a-66d are placed on sea bottom 60. While only four receivers are shown for clarity of illustration, there are typically many more receivers used in a logging operation. The location and orientation of the electrical dipole source is also shown. In a subsea logging operation, the electrical dipole source is typically towed by a boat to move above the receivers. The subsea formations, in this illustration, include four layers 61-64, having different electrical properties. One of ordinary skill in the art would appreciate that any number of layers may be included in such a model. The model for resistivity inversion will include relative arrangements, thickness, and conductivities of the different layers (e.g., layers 61-64). In addition, the model would also include the parameters for the four receivers 66a-66d, such as the impedance of the receivers, their locations, their sizes, etc. Thus, the receivers are treated as an integral part of the layered-earth model.

With the model shown in FIG. 6, the raw measurement data, whether obtained with ideal receivers or non-ideal receivers, can be inverted to derive the true formation electrical properties. Any suitable inversion techniques may be used. For example, the layered-earth formation inversion may be used to invert for the parameters of the layered earth (conductivity and thickness of the layers) from the measured values of the electric and magnetic fields at various points on the sea bottom, and for various positions of the source. This is typically done by computing the field distribution created for a given set of parameters of the layers (forward problem), and varying said parameters in an iteration loop until one obtains a good match with the measured fields. A number of algorithms to do that while minimizing the number of iterations are well known. As an introduction to the vast literature on the data inversion, see for example: Albert Tarantola, "*Inverse Problem Theory and Methods for Model Parameter Estimation*," SIAM, Philadelphia, 2004.

In the case of complex receivers (e.g., non-ideal receivers) that themselves distort and affect the EM field distribution, it might be necessary to modify the forward problem calculation so that it takes into account the presence of the complex receivers. For example, in the presence of modified Mosnier receivers, this may consist of calculating the forward problem of a layered-earth model that includes, in addition to the actual formation layers, an additional layered medium, in which there is a number of perfectly conducting metallic plates (electrodes) linked by a low impedance. That is, the modified Mosnier receivers are modeled as an additional layer (a virtual layer). This makes the forward problem more computationally intensive. However, it can still be solved by any known numerical analysis techniques, such as finite element, finite differences, finite volume, integral equations, etc. With such a model, the inversion of the measurement data to derive the parameters of the layers may proceed as in a normal case.

This modeling approach also enables one to assess how much the use of receivers may affect the sensitivity to the layers of interest. Any technique known in the art for such inversion problems may be used to assess the sensitivity of the survey design (position and types of source and receivers) to the parameters of interest (e.g. conductivity of the earth between 500 and 1500 meters depth). One common technique is to look at the derivatives of the forward problem with respect to such parameters. Here, when the receivers distort the original field, some distortions will not significantly affect the sensitivity of the inversion to the parameters of interest, while other types of distortion might decrease that sensitivity. For example, with modified Mosnier type receivers, if the sea bottom is covered with too many large, short-circuited electrodes, the sub-sea earth layers may become effectively shielded from the applied field, and the survey loses sensitivity to the properties of the earth layers. The standard inversion problem theory described here allows one to examine the sensitivity provided by various possible designs of the receivers and to select the best compromise between the ease of use and the ability to achieve the survey objectives.

The above described examples show that receivers, whether ideal or non-ideal, may be used to measure formation resistivities and the data may be corrected for any non-ideal effects. In addition to the limited examples described above, one of ordinary skill in the art would appreciate that other modifications and variations of the methods may be used without departing from the scope of the invention.

Figure 7:
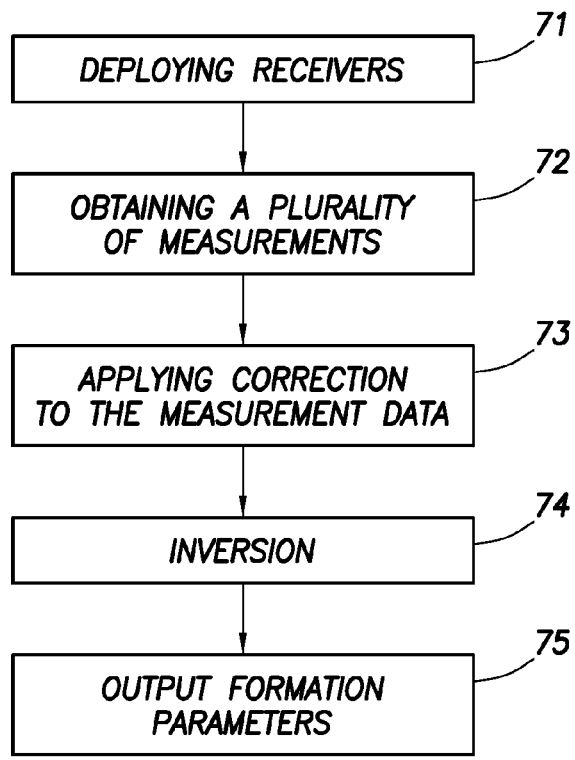
FIG. 7 shows a flowchart of an example method for determining formation electrical properties.

While various approaches may be used to correct for non-ideal receiver effects, FIG. 7 illustrates a general example where a plurality of receivers are typically deployed at the measurement sites (step 71). In one example, the receivers are dropped from a surface vessel, and they descend through the seawater to a position on the seafloor. In another example, the receivers may be repositioned using an ROV. The receivers may have some characteristics (e.g., sizes, electrode separations, etc.) that are know before deployment. In addition, certain parameters of the receivers may be determined after deployment, such as locations and orientations. The locations of the receivers after deployment may be determined, for example, using acoustic devices. In another example, the receiver may use signals from the source at a known position to determine the receiver position. Thus, the receiver parameters need for any correction or inversion can be determined.

Next, a number of measurements are obtained using the deployed receivers (step 72). The measurement may be performed with artificial (e.g., CSEM) and/or natural (e.g., MT) sources. These measurements may include measurements of electric field and/or magnetic field strengths.

Before inversion, the measurement data are subjected to correction for any non-ideal effects (step 73). Any of the above-described correction approaches or similar approaches may be used. For example, the measurement data may be corrected using one or more correction factors or using transformation functions, such as one of the transform functions described above. Similarly, correction may also be accomplished with modeling, such as the general modeling that include the receivers in the formation model.

After the measurement data are corrected for any undesired effects, the corrected data can then be inverted to provide the formation electrical properties (step 74). Any inversion method known in the art may be used. The formation parameters thus obtained are then output (step 75). Note that the method shown in FIG. 7 is only one example, and other variations are possible. For example, the method may start from data correction (step 72) based on previously acquired data. Therefore, the example method shown in FIG. 7 is for illustration, and it is not intended to limit the scope of the invention.

The above-described examples may have one or more of the following advantages. Certain example methods may use non-ideal receivers in EM surveying. Such non-ideal receivers may be designed to provide better SNR, for example. In addition, ideal receivers in non-ideal conditions may collect usable data. The burden of designing "ideal" receivers is shifted to data correction, using computer modeling, for example. The disclosed examples are generally applicable, regardless of the types of the receivers (ideal or non-ideal, voltage or current measurement type).

While the invention has been described with respect to a limited number of embodiments, those skilled in the art, having benefit of this disclosure, will appreciate that other embodiments can be devised which do not depart from the scope of the invention as disclosed herein. For example, although exemplary embodiments have been described in terms of sea bed logging in the environment of sea water, one of ordinary skill in the art would appreciate that receivers and methods may also be applied to other types of measurements, such as on land or in a wellbore. Accordingly, the scope of the invention should be limited only by the attached claims.

What is claimed is:

1. A method for determining formation electrical properties, comprising
   deploying one or more receivers for electromagnetic logging;
   obtaining measurement data indicative of the formation electrical properties using the deployed one or more receivers;
   correcting the measurement data for receiver non-ideality, wherein correcting the measurement data is based at least on impedance of the one or more receivers and on impedance of water in which the one or more receivers are deployed; and
   inverting the corrected measurement data to obtain one or more parameters of formation electrical properties.

2. The method of claim 1, wherein the correcting the measurement data is performed with a correction factor, wherein the correction factor is based at least on the impedance of the one or more receivers and on the impedance of water in which the one or more receivers are deployed.

3. The method of claim 2, further comprising configuring the impedance of the one or more receivers to be smaller than impedance of water displaced by the one or more receivers.

4. The method of claim 1, wherein the one or more receivers are deployed on a sea floor.

5. The method of claim 1, wherein the correcting the measurement data is performed with a transform function.

6. The method of claim 1, wherein correcting the measurement data is further based on relative conductivities of the water and a sediment layer in which the one or more receivers are at least partly buried.

7. A method for determining formation electrical properties, comprising:
   deploying one or more receivers for electromagnetic logging;
   obtaining measurement data indicative of the formation electrical properties using the deployed one or more receivers; and
   inverting the measurement data to correct the measurement data and to obtain one or more parameters of formation electrical properties, wherein correcting the measurement data is based at least on impedance of the one or more receivers, wherein correcting the measurement data is further based on impedance of water in which the one or more receivers are deployed.

8. The method of claim 7, wherein correcting the measurement data is further based on relative conductivities of the water and a sediment layer in which the one or more receivers are at least partly buried.

9. The method of claim 7, further comprising configuring the impedance of the one or more receivers to be smaller than impedance of water displaced by the one or more receivers.

10. A method for determining formation electrical properties, comprising
    deploying one or more receivers for electromagnetic logging;
    obtaining measurement data indicative of the formation electrical properties using the deployed one or more receivers;
    correcting the measurement data for receiver non-ideality, wherein correcting the measurement data is based at least on impedance of the one or more receivers; and
    inverting the corrected measurement data to obtain one or more parameters of formation electrical properties, wherein each of the one or more receivers have electrodes for measuring current densities, wherein the impedance of each receiver is the impedance between the electrodes.

11. The method of claim 7, wherein inverting the measurement data is performed by modeling using a formation model, wherein the impedance of the one or more receivers is modeled by the formation model.

12. The method of claim 11, wherein the formation model is a layered-earth model, and wherein the one or more receivers are represented as a layer in the layered-earth model.

13. A method for determining formation electrical properties, comprising deploying one or more receivers for electromagnetic logging;

obtaining measurement data indicative of the formation electrical properties using the deployed one or more receivers;

correcting the measurement data for receiver non-ideality, wherein correcting the measurement data is based at least on impedance of the one or more receivers; and inverting the corrected measurement data to obtain one or more parameters of formation electrical properties;

wherein the one or more receivers are deployed on a sea floor, wherein at least one of the one or more receivers is partly buried in a sediment layer, and wherein correcting the measurement data is further based on a conductivity ratio between seawater and the sediment layer.

* * * * *